C. E. & C. T. FOOTE.
MIXING MACHINE.
APPLICATION FILED AUG. 21, 1907.

978,011.

Patented Dec. 6, 1910.
6 SHEETS—SHEET 1.

Fig. 1.

Witnesses:
Christ Feinle
Harry D. Rapp

Charles E. Foote
and Chester T. Foote, Inventors.
By Emil Neuhart
Attorney.

C. E. & C. T. FOOTE.
MIXING MACHINE.
APPLICATION FILED AUG. 21, 1907.

978,011.

Patented Dec. 6, 1910.
6 SHEETS—SHEET 2.

Witnesses:
Christ Feinle.
Harry D. Rapp.

Charles E. Foote
and Chester T. Foote } Inventors.
By Emil Neuhart,
Attorney.

UNITED STATES PATENT OFFICE.

CHARLES E. FOOTE AND CHESTER T. FOOTE, OF NUNDA, NEW YORK, ASSIGNORS TO THE FOOTE MANUFACTURING COMPANY, A FIRM CONSISTING OF CHARLES S. WARNER, WILSON H. WILLARD, OSCAR J. WILLARD, CHARLES E. FOOTE, FRED G. OLP, AND CHESTER T. FOOTE, OF NUNDA, NEW YORK.

MIXING-MACHINE.

978,011.  Specification of Letters Patent.  Patented Dec. 6, 1910.

Application filed August 21, 1907. Serial No. 389,551.

*To all whom it may concern:*

Be it known that we, CHARLES E. FOOTE and CHESTER T. FOOTE, both citizens of the United States, and residents of Nunda, in the county of Livingston and State of New York, have invented certain new and useful Improvements in Mixing-Machines, of which the following is a full, clear, and exact description.

Our invention relates to mixing-machines of the type generally known as "batch mixing-machines."

The primary object of our invention is the production of a mixing-machine wherein the material is carried upward, deflected laterally in opposite direction and simultaneously carried toward the horizontal center of the machine, and in which a double cone-shape drum is provided having interior mixing-wings and discharge-wings that constantly change their angles, and consequently subject the material to a constantly changing motion, whereby a thorough and exceedingly quick mixing is obtained.

Other objects are, the provision of movable discharging-means whereby the mixture can be quickly and directly discharged into wheel-barrows, so that a second handling of the mixture is eliminated; to so arrange said discharging-means that it can be quickly moved into active position and as quickly moved into inactive position so that any quantity of the mixture may be discharged and the discharge cut-off at will; to improve on the driving-mechanism so that the strain on the mixing-drum is reduced to a minimum; to provide improved means for supporting the mixing-drum; and to otherwise improve on mixing-machines now in use.

To these ends, the invention consists in the construction, arrangement, and combination of parts to be hereinafter described and particularly pointed out in the subjoined claims.

Figure 2:
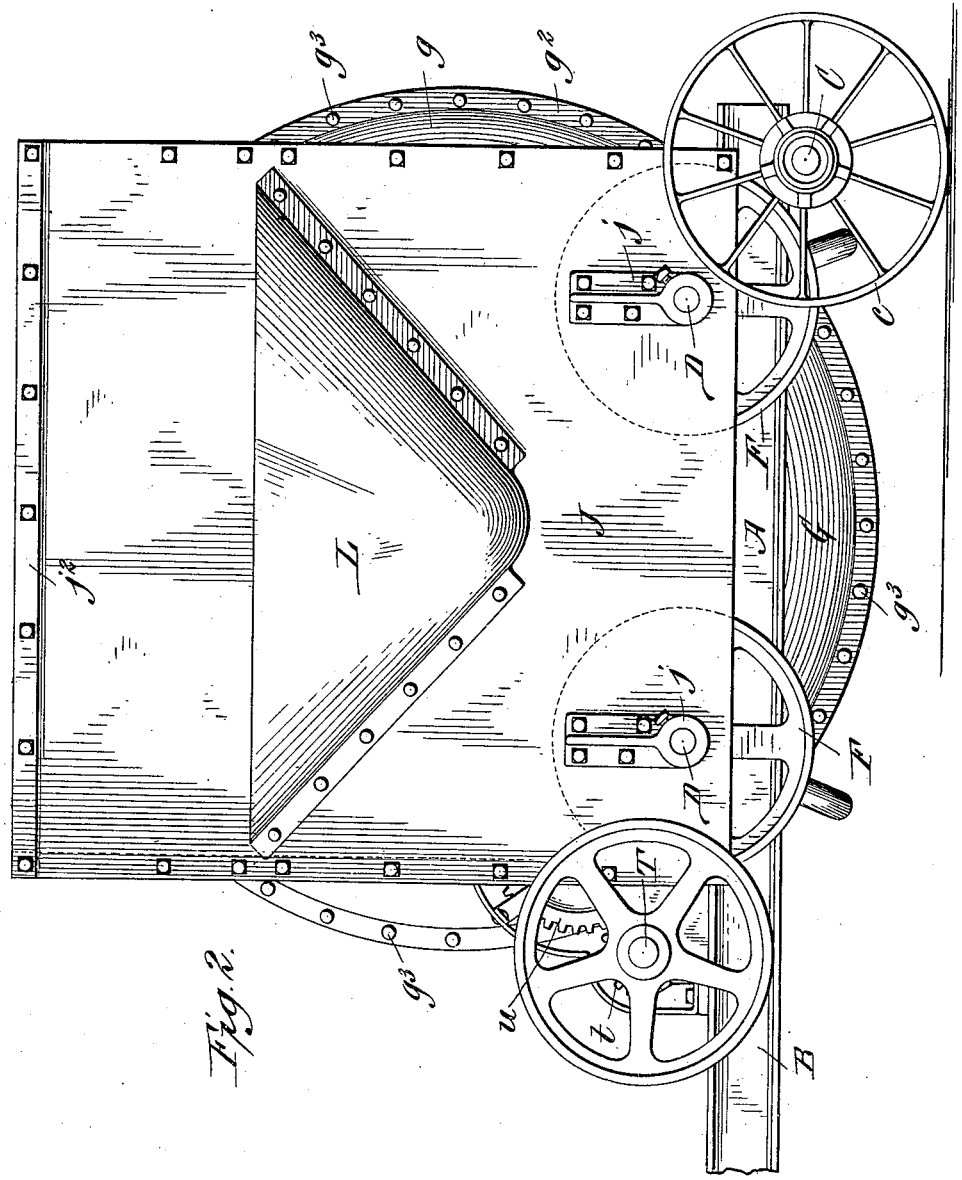
Figure 3:
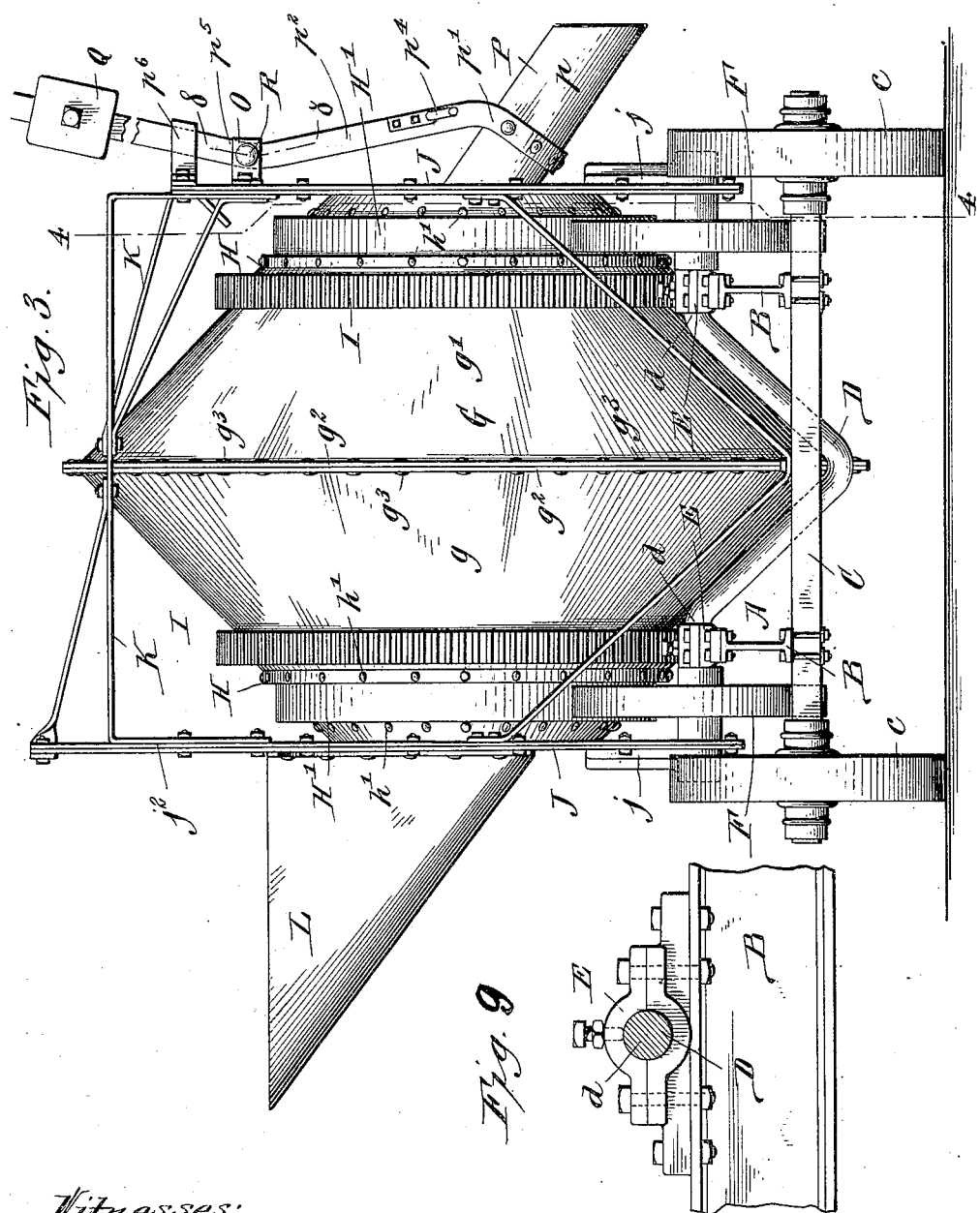
Figure 4:
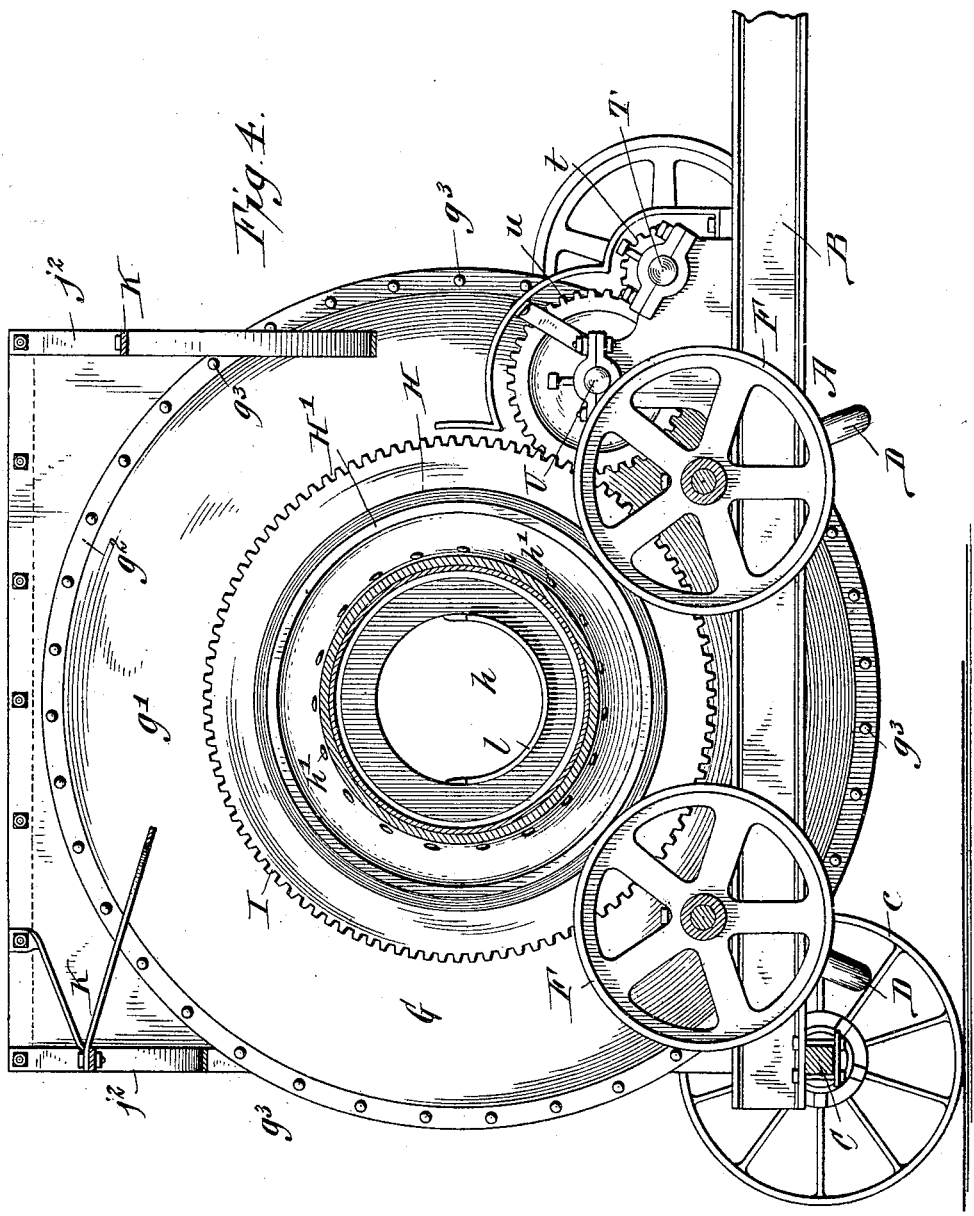
Figure 5:
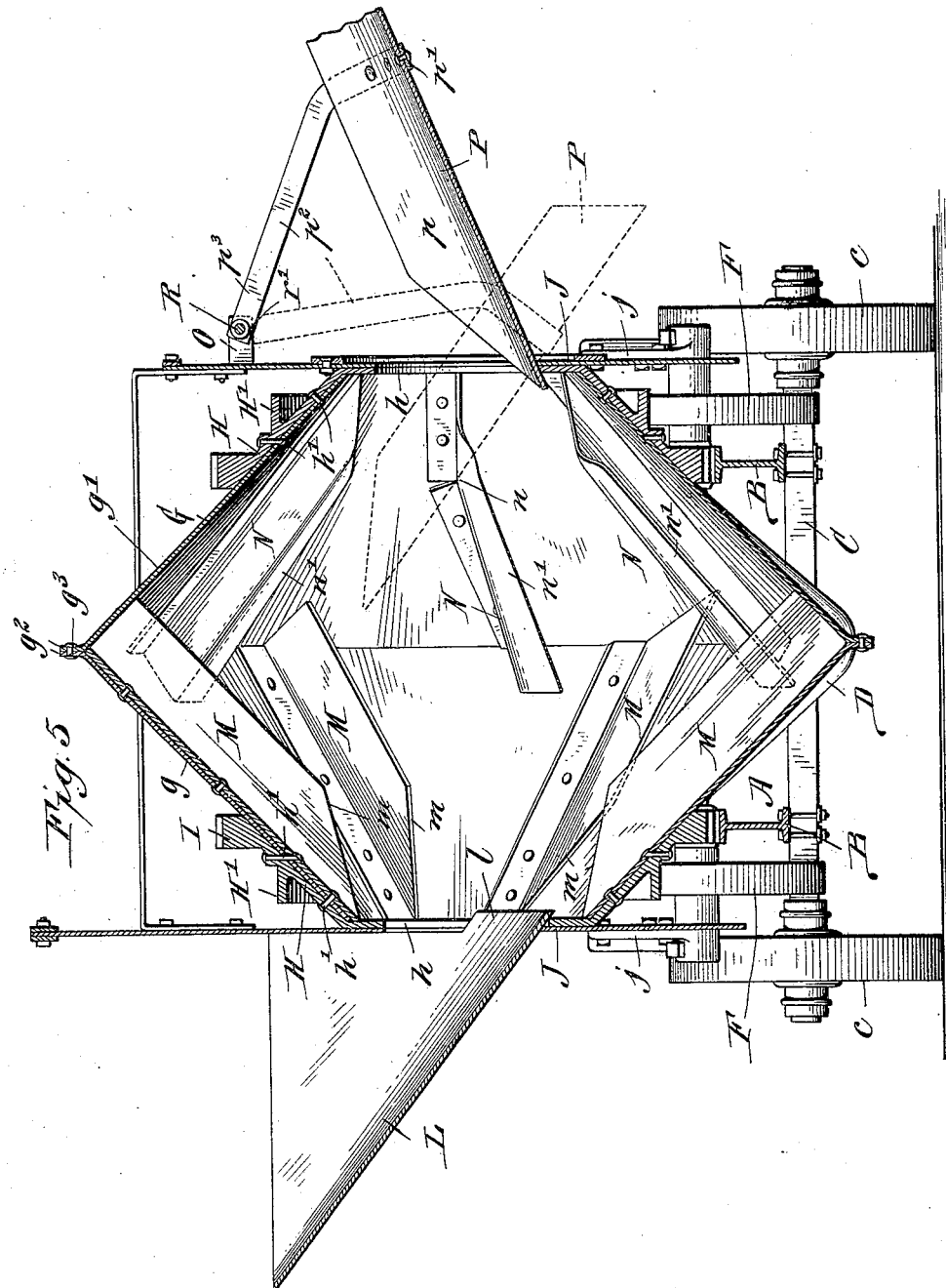
Figure 6:
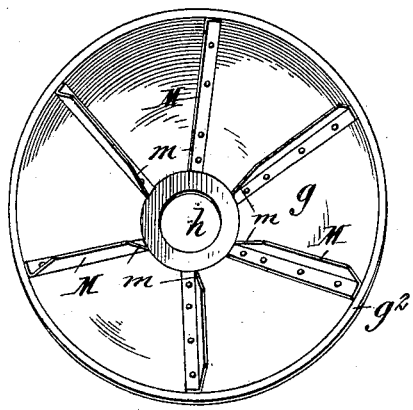
Figure 7:
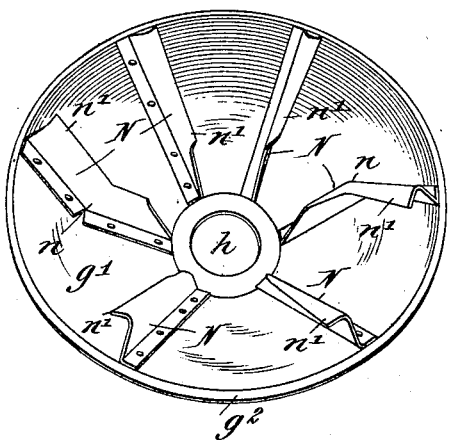
Figure 8:
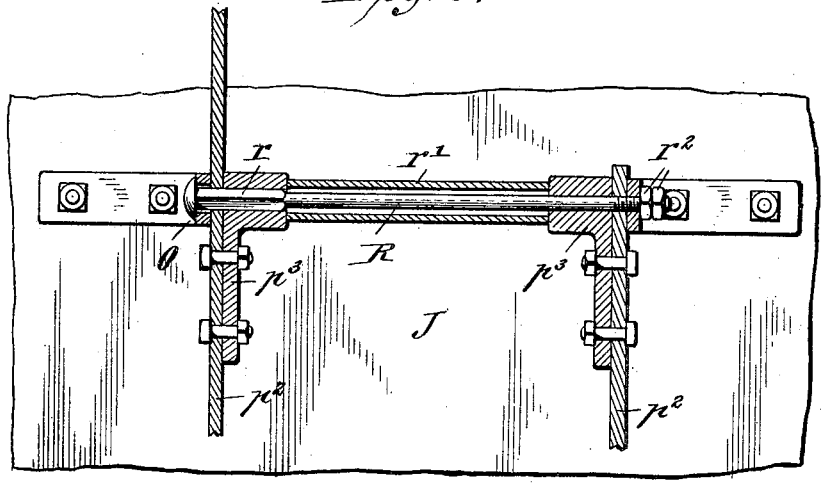

In the drawings,—Figures 1 and 2 are side elevations of our improved mixing-machine viewed from opposite sides. Fig. 3 is a rear view of the same. Fig. 4 is a longitudinal section taken on line 4—4, Fig. 3. Fig. 5 is a transverse section taken on line 5—5, Fig. 1. Fig. 6 is a detached perspective view of the cone member of the drum on the charging side thereof. Fig. 7 is a detached perspective view of the cone-member of the drum on the discharge side thereof. Fig. 8 is an enlarged vertical section taken on line 8—8, Fig. 3. Fig. 9 is an enlarged side elevation of the bearing for the bar supporting the bearing-rollers.

Referring now to the drawings in detail, like letters of reference refer to like parts throughout the several figures.

A designates the frame of the machine, and comprises longitudinal side beams B of I-formation in cross-section which may be tied together at the front end of the machine in any practicable manner, and which have their rear ends connected by an axle C on which the rear traction-wheels $c$ are mounted.

D designates cylindrical bars which are bent into substantial V-shape with the ends $d$ clamped in boxes E secured to the I-beams B; said boxes being of any practicable construction, so long as they serve to securely clamp the bars against rotation. Mounted for rotation on said bars outside of said boxes are supporting rollers F, on which a double-cone shaped mixing-drum G is supported. Said drum comprises two oppositely directed cone-shape members $g$, $g^1$, which are formed of sheet steel the converging walls thereof having outstanding peripheral flanges $g^2$ at their inner contiguous ends or greatest diameter through which rivets $g^3$ are passed to assure a secure and tight connection between said members. The outer or smaller ends of said cone-shape members are set into cast-iron heads H having integral circumferential guide-tracks or flanges $H^1$ which ride over the supporting-rollers F, and drum-gears I; the outer ends of said heads being open, as at $h$. The sheet-steel cone-shaped portions and the heads of the drum are riveted together, as at $h^1$.

Supported on the extremities of the V-shape bars D are opposite metallic side-shields J having cast-bearings $j$ bolted thereto through which the extremities of said bars are passed and which provide the necessary strength to support the weight of said shields. Each of said shields lies in contact with or in close proximity to the corresponding end of the drum and has a central opening $j^1$ which registers with the opening in the adjacent end of said drum. Said shields may be stiffened along their edges by bolting or otherwise securing stiffening-bars $j^2$ thereto. The side shields are connected and braced by bars K and they protect the gearing and drum bearings from materials spilled in charging or discharging. The shield at the charging side of the drum also permits the use of a large charging hopper, to be presently described so that large quantities of material may be delivered to the drum to be charged thereinto without in any manner coming in contact with any external moving parts.

L designates a charging-hopper which is riveted or otherwise secured to the shield at the charging-side of the machine; it having an extending portion $l$ which extends into lower half of the opening in the head at the charging end of the drum. By extending a portion of the hopper into the drum, the finer portions of the material cannot work their way between the drum and side-plate.

The double-cone drum has its tapering walls at an angle of 45 degrees, which we have found by experiment gives a very rapid and effective mixing of the material with the least complicated arrangement of mixing adjuncts within the drum. This particular angle is not absolutely necessary; and where space in height will not permit, the walls of the cone may be set at a greater angle to the vertical; or when space in width will not permit, the walls may be set at a less angle to the vertical.

The cone-member $g$ on the charging side of the drum has a number of straight wings M riveted or otherwise secured to its inner face, each wing being substantially of L-shape in cross-section and the portions extending inward from the wall of the drum having their outer ends beveled, as at $m$, so as not to check the entrance of material into the drum. Said wings are preferably set in direct radial lines, and upon revolving of the drum, carry the material upward from the lowest point thereof until the wings pass the horizontal, when the material rides along the wings toward the charging end and again drops to the lowest point. The inner ends of said wings terminate at a point beyond the center or greatest diameter of the drum.

The cone-member $g^1$ on the discharge side of the drum has a number of wings N which are in staggered relation to the wings M and several of which are set in direct radial lines and are of substantially Z-formation in cross-section to form scoop-wings. The remainder of the wings N are also of Z-formation in cross-section and are bent between their ends, as at $n$, so that a portion of each bent wing is in a direct radial line, and a portion thereof directed slightly rearward with relation to the direction of rotation of the drum. By constructing the discharging wings in the manner described, overhanging flanges $n^1$ are provided along the free longitudinal edge which act to retain the material until the wings reach the highest points in their travel, but upon approaching such points, the material retained thereby begins to ride along said flanges and part discharges over the outer ends of said wings, which are cut on a bevel to provide a free escape for the material. Like the wings M, these wings also extend from the head at the discharge end of the drum or from a point in close proximity thereto to a point beyond the center or greatest diameter of the drum.

The construction of the wings as described, assures a most rapid and effective mixing as the wings M assure a quick return of the materials in partially mixed condition to the bottom of the drum and also a forward movement, after being elevated slightly above the horizontal center, and by reason of the wings M and N overlapping at the center of the drum, the wings N are compelled to scoop up and elevate the mixture and discharge the same from the drum.

It is of course understood, that the stone, sand, and cement, or other material constituting the mixture must be wet, and by elevating the mixture and discharging it on an incline, the plastic or thinner portion of the mixture tends to move more freely along the discharging wings than the heavy or dry portion, and consequently the rearwardly bent portion acts to retard the delivery of the plastic portion until the heavier or drier portion is being delivered.

Secured to the shield at the discharge side of the machine is a bracket O to which is pivotally secured a balance discharge-chute P. Said chute consists of a sheet-metal U-shaped trough $p$ riveted to a bar $p^1$ passing underneath the same and extending upward in the form of two arms $p^2$, one of which terminates at the bracket O and the other being extended upward beyond the bracket and provided with an adjustable weight Q which serves to maintain the chute in either of two positions. Bolted to the arms $p^2$ are castings $p^3$ and passing through said castings, the arms $p^2$ and the bracket, is a pivot-bolt R having a square portion $r$ passing through one of said castings so that the pivot-bolt turns with the movement of said arms. Surrounding said bolt is a sleeve $r^1$ which abuts with its ends against said castings and prevents inward deflection of the arms $p^2$. To prevent accidental dislodgment of the pivot-bolt, nuts $r^2$ are applied to its threaded end. For conveniently swinging the chute from one position to its other, it is provided with handles $p^4$. The arm $p^2$ to which weight Q is applied is bent at $p^5$ so that the extended portion thereof is at an angle to the vertical in either of its two positions and consequently the weight thereon acts to maintain the chute in either of the two positions it may be placed. The arm $p^2$ carrying the weight is limited in its outward movement by a yoke $p^6$ which is secured to the side-plate at the discharge end of the drum.

T designates a power-shaft which may be driven in any approved manner, it having pinions $t$ that mesh with gears $u$ on a counter-shaft U; said power-shaft and counter-shaft being journaled in boxes V secured to the I-beams B. Gears $u$ mesh with the drum-gears I and cause rotation of the mixing-drum.

The material for making concrete is placed into the hopper, from whence it is fed into the mixing-drum. The latter may be set into motion before the charging takes place, or after the material is delivered into the drum, as may be desired. Power for rotating the drum is transmitted from the power-shaft through the pinions $t$ and gears $u$ to the drum-gears I arranged on opposite sides of the drum. By driving the drum in this manner, it is relieved of twisting and side strains, as the power is evenly applied. This assures a free and even rotation of the drum on the supporting-rollers, also arranged on opposite sides of the drum and adapted to support the latter. The material is carried up and thoroughly turned-over by the mixing-wings and discharge-wings during the rotation of the drum, and during this mixing operation the discharge chute P is swung outward into the position shown in full lines in Fig. 5.

When the material is thoroughly mixed, the discharge-chute may be swung into the position shown in Fig. 3, (also shown in Fig. 5 in dotted lines) whereupon the mixture elevated by the discharge-wings and carried thereby to the highest point is delivered into the discharge-chute and out of the machine. A wheel-barrow or other receptacle may be placed beneath the outer end of the chute to receive the mixture. As this machine is arranged with traction wheels, it may in some classes of work be moved about to discharge the mixture at the point needed.

By arranging the beams on opposite sides of the mixing-drum, the latter is set quite low, which is a very desirable feature of our invention.

The supporting of the mixing-drum upon four comparatively large rollers arranged on opposite sides of the drum and in front and rear of the vertical center of the drum, greatly reduces the friction and insure free movement of the drum. The V-shaped bars D on which the drum-rollers rotate also serve as a means to tie the beams of the machine together, making the frame absolutely rigid, and preventing the possibility of the drum getting out of alinement. Moreover, the bending of said bars into V-shape permits the drum to be set low. The shields serve to protect the gearing and drum-rolls, and support the charging hopper and the discharge-chute. They are tied together at the top by braces and at the bottom by the bars of the drum-rollers; thus being firmly braced.

Having thus described our invention, what we claim is,—

1. In a mixing-machine, a tapering mixing-drum having mixing-wings and discharge-wings secured to the inner sides of its walls and an opening through which the material is discharged, said discharge-wings having their free longitudinal edges bent at an angle to form scoops, and at least one of said discharge-wings bent rearward at a point between its ends.

2. In a mixing-machine, the combination of a revoluble drum tapered from its center toward opposite ends and having an opening at each end, straight wings secured to the inner side of the wall on one side of its center and scoop-shape wings secured to the inner side of the wall on the other side of its center, and a discharge-chute normally held in an inoperative position and movable into a position coöperating with said scoop-shape wings to discharge the material from the drum.

3. In a mixing-machine, the combination with a frame having longitudinal side-beams, of bearings secured to said beams, two transverse bars bent into V-shape between their ends and secured against rotation in said bearings, supporting rollers mounted to rotate on said bars and through which said bars pass, a double cone-shape mixing-drum arranged transversely and supported on said rollers with the V-shaped portions of said bars straddling the enlarged center portion of said drum, and means to cause said drum to rotate.

4. In a mixing-machine, the combination with a frame, of a vertical plate supported on said frame and having an opening, a mixing-drum in rear of and in close proximity to said plate having a discharge opening in registration with the opening in said plate, a bracket secured to said plate in a plane above the opening therein, a discharge-chute, bars to which said chute is secured and which are pivotally attached to said bracket, one of said bars being extended upward beyond its pivotal point, and a weight adjustable on the extended portion of said last-mentioned bar.

5. In a mixing-machine, a drum converging toward its ends and having openings in its ends, and mixing wings secured to the inside of each tapering part of said drum, the wings of the two tapering parts arranged alternately within the drum.

6. In a mixing-machine, a drum converging toward its ends and having openings in said ends, and wings secured to the inner sides of the converging walls of said drum, said wings having their outer ends cut obliquely, as and for the purpose set forth.

7. In a batch-mixer, a drum having heads, the sides of the drum converging toward its heads, and wings secured to the inside of the drum, the wings being disposed from a point in close proximity to one of the heads of the drum to a point beyond the greatest diameter of the drum.

8. In a batch-mixer, a drum converging toward its ends, and radially-disposed wings secured to the inside of the drum, the wings being disposed from a point in close proximity to one of the ends of the drum to a point beyond the greatest diameter of the drum.

9. In a batch-mixer, a drum converging toward its ends, and concave wings spaced apart disposed in the drum from a point in close proximity to one of its ends to a point beyond the greatest diameter of the drum.

10. In a batch-mixer, a drum converging toward its ends, and concave wings spaced apart disposed in the drum to rotate therewith from a point in close proximity to one of its ends to a point beyond the greatest diameter of the drum, the outer ends of the wings being cut obliquely to form obtuse angles with their inner sides.

11. In a batch-mixer, a drum converging toward its ends, and radially-disposed wings spaced apart disposed in the drum to rotate therewith, the wings extending from a point in close proximity to one of the ends of the drum to a point beyond the greatest diameter of the drum, the outer ends of the wings being cut obliquely to form obtuse angles with their inner sides.

12. In a batch-mixer, a drum converging toward its ends, and wings spaced apart disposed inwardly from the sides of the drum from a point in close proximity to one of the ends of the drum to a point beyond the drum's greatest diameter, the planes of the wings being disposed at an angle to the radii of the axis of the drum.

13. In a batch-mixer, a drum, concave wings spaced apart disposed inwardly from the side of the drum, the oppositely-disposed wings converging toward one of its ends, and wings disposed inwardly from the side of the drum, the said wings converging toward the other end of the drum with their planes disposed at an angle to the radii of the axis of the drum, the inner terminals of the two sets of wings lapping each other.

14. In a batch-mixer, a drum converging toward its ends, concave wings spaced apart disposed inwardly from the side of the drum, the sides of the concave wings diverging outwardly, and wings disposed from the side of the drum, the planes of the said wings being disposed at an angle to the radii of the axis of the drum, the inner terminals of the two sets of wings lapping each other.

15. In a batch-mixer, a drum converging toward its ends, radially-disposed concave wings spaced apart disposed inwardly from the side of the drum, the sides of the concave wings diverging toward one of the ends of the drum, and wings disposed inwardly from the side of the drum, the planes of the said wings being disposed at an angle to the radii of the axis of the drum, each set of wings extending inwardly beyond that portion of the drum having the greatest diameter.

16. In a batch-mixer, a drum converging toward its ends, radially-disposed concave wings spaced apart disposed inwardly from the side of the drum, the sides of the concave wings diverging toward one of the ends of the drum, wings disposed inwardly from the side of the drum, the planes of the said wings being disposed at an angle to the radii of the axis of the drum, each set of wings extending inwardly beyond that portion of the drum having the greatest diameter, and means to rotate the drum.

In testimony whereof, we have affixed our signatures in the presence of two subscribing witnesses.

CHARLES E. FOOTE.
CHESTER T. FOOTE.

Witnesses:
HARRISON PECK,
ROBT. E. BALTY.